United States Patent [19]

Bloom

[11] Patent Number: 4,937,135
[45] Date of Patent: Jun. 26, 1990

[54] THERMOFORMABLE POLYARYLETHERKETONE/POLYVINYL FLUORIDE LAMINATES

[75] Inventor: Joy S. Bloom, Wilmington, Del.

[73] Assignee: E. I. Du Pont de Nemours and Company, Wilmington, Del.

[21] Appl. No.: 283,696

[22] Filed: Dec. 13, 1988

[51] Int. Cl.⁵ .......................... B32B 7/02; B32B 27/08
[52] U.S. Cl. .................................... 428/215; 428/220; 428/421
[58] Field of Search ................ 428/421, 245; 528/176, 528/180, 207; 525/150; 526/207

[56] References Cited

U.S. PATENT DOCUMENTS

| | | | |
|---|---|---|---|
| 3,065,205 | 11/1962 | Bonner | 528/180 |
| 3,265,678 | 8/1966 | Hecht | 526/207 |
| 3,441,538 | 4/1969 | Marks | 528/176 X |
| 3,442,857 | 5/1969 | Thornton | 528/207 X |
| 4,578,427 | 3/1986 | Saito et al. | 525/150 |
| 4,624,886 | 11/1986 | Cogswell et al. | 428/245 |
| 4,657,717 | 4/1987 | Cattanach et al. | 264/10.2 |
| 4,662,887 | 5/1987 | Turner et al. | 623/16 |
| 4,816,556 | 3/1989 | Gay et al. | 528/176 |

FOREIGN PATENT DOCUMENTS 0195562 6/1986 European Pat. Off.

*Primary Examiner*—Thomas J. Herbert
*Attorney, Agent, or Firm*—Paul R. Steyermark

[57] ABSTRACT

A thermoformable laminate comprising (1) a polyaryletherketone sheet having repeating units derived from diphenyl ether having attached to one of the phenyl rings either a 1,4-phenylenedicarbonyl group or a 1,3-phenylenedicarbonyl group, the ratio of 1,4-phenylenedicarbonyl groups to 1,3-phenylenedicarbonyl groups being 70:30 to 0:100, preferably 60:40 to 0:100, especially 60:40 to 50:50, the sheet thickness being about 625–5000 micrometers, and (2) a polyvinyl fluoride film having a thickness of about 12.8 to 204 micrometers can be thermoformed at a temperature of about 160°–200° C., especially 170°–195° C. One important application of such thermoformable sheets is in fabricating three-dimensional panels for aircraft interiors.

11 Claims, 3 Drawing Sheets

FIG. 3
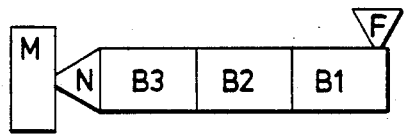
FIG. 4  FIG. 4A  FIG. 4B
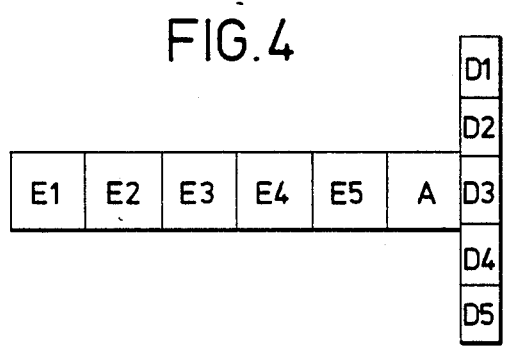
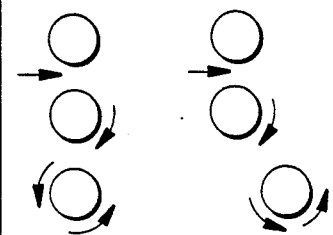

THERMOFORMABLE POLYARYLETHERKETONE/POLYVINYL FLUORIDE LAMINATES

BACKGROUND OF THE INVENTION

This invention relates to a novel thermoformable laminate comprised of a polyaryletherketone sheet and a polyvinyl fluoride sheet or film and to thermoformed articles produced therefrom.

Shaped articles can be prepared from thermoplastic sheets using a thermoforming process. Thermoforming is defined in Tool and Manufacturing Engineers Handbook (Vol. 2, 4th Edition, Society of Manufacturing Engineers, Dearborn, Mich., 1984, Charles Wick, Editor) as a process in which a thermoplastic sheet is heated to its processing temperature and, using mechanical methods or differential pressure created by vacuum and/or pressure, is forced to contact a mold surface and cooled while held to the contours of the mold until it retains the shape of the mold.

It is well known by those skilled in the art of thermoforming that processing temperatures at or above the crystalline melting points are required to form articles from semicrystalline polymers. Thus, as described in the art, the temperatures required for thermoforming polyaryletherketone sheets are in the range of 300 to 400° C., where these materials melt. Polyvinyl fluoride, however, decomposes at temperatures above about 200° C., so that laminates of polyarylketones with polyvinyl fluoride normally cannot be thermoformed because of polyvinyl fluoride film degradation.

It, therefore, would be desirable to provide laminates of a polyaryletherketone sheet with a polyvinyl fluoride sheet or film, such laminates being thermoformable at temperatures below 200° C., without risk of thermal degradation of the polyvinyl fluoride component.

SUMMARY OF THE INVENTION

According to this invention there is provided a thermoformable laminate of a polyaryletherketone sheet having a thickness of about 625 to 5000 micrometers and a polyvinyl fluoride (PVF) film having a thickness of about 12.8 to 204 micrometers, wherein the polyaryletherketone sheet has a crystallinity of less than about 5% and consists essentially of repeating units corresponding to the following formula:

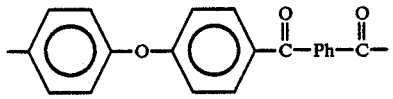

wherein Ph is either the 1,4-phenylene or the 1,3-phenylene group. In the former case, the

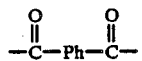

moiety is the terephthalyl group (T), and in the latter case, it is the isophthalyl group (I); the T:I ratio being about 70:30 to 0:100, preferably 60:40 to 0:100, and especially 60:40 to 50:50.

BRIEF DESCRIPTION OF THE DRAWINGS

FIG. 3 is a schematic drawing of an injection molding machine used in making polyaryletherketone sheets constituting one of the layers of the laminates of the present invention.

FIGS. 4, 4a and 4b are schematic drawings of extruders and associated chill roll stacks used in making polyaryletherketone sheets constituting one of the layers of the laminates of the present invention.

DETAILED DESCRIPTION OF THE INVENTION

Figure 1:
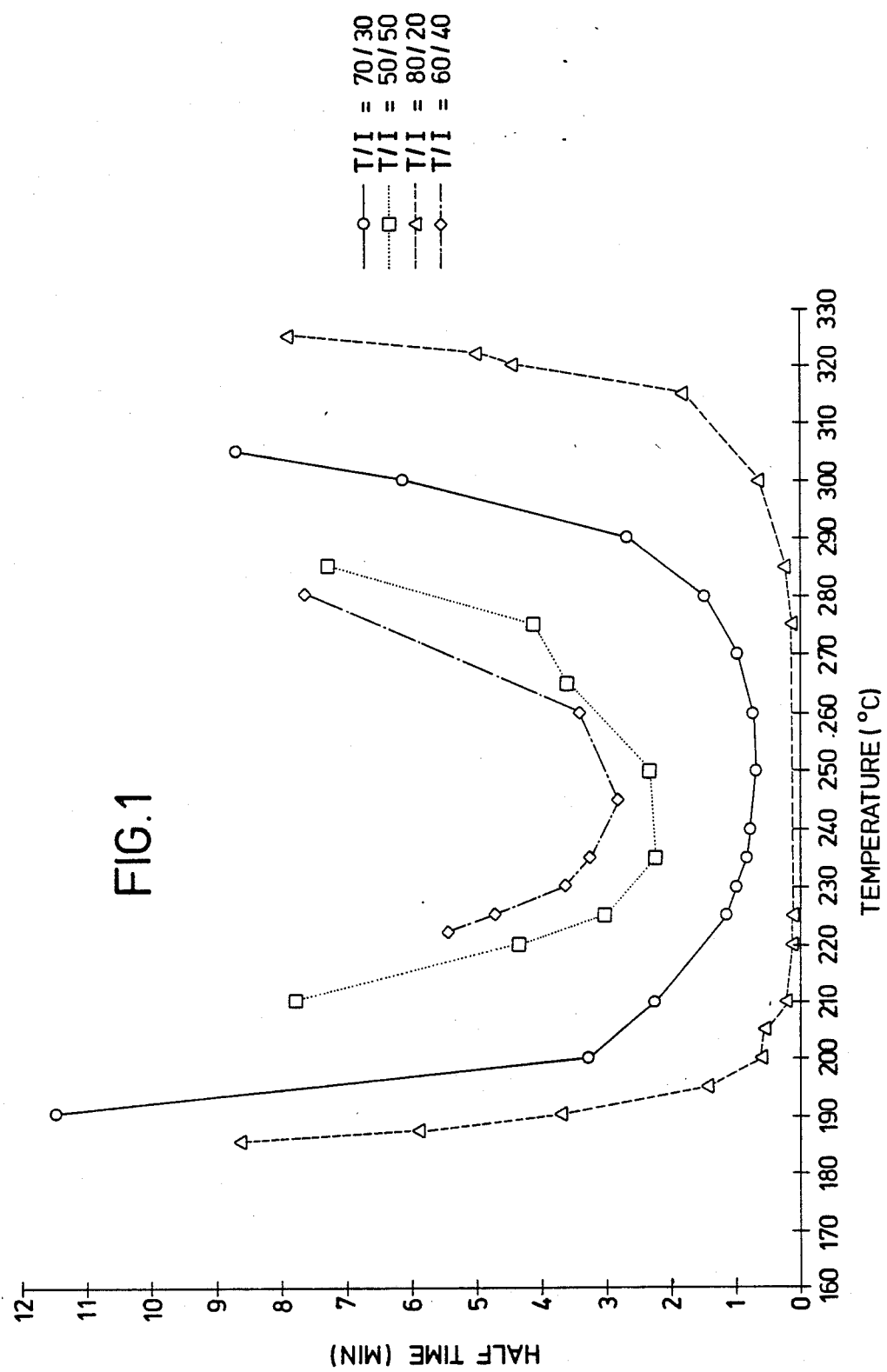
FIG. 1 is a plot of crystallization half-time, in minutes, of various polyaryletherketones vs. temperature, in degrees Celsius

Polyaryletherketones suitable in making the laminates of this invention are well known and can be obtained, e.g., by a reaction of terephthalyl chloride and isophthalyl chloride with diphenyl ether in the presence of a Friedel-Crafts catalyst, as described in U.S. Pat. Nos. 3,065,205 (W. H. Bonner); 3,441,538 (B. M. Marks); 3,442,857 (R. L. Thornton) and U.S. patent, application Ser. No. 762,252 to Gay et al., now U.S. Pat. No. 4,816,556.

The polyaryletherketone compositions from which sheets used in the laminates of the present invention are made may also contain non-nucleating fillers in an amount of up to 50% by weight of the total composition. Representative fillers include titanium dioxide, inorganic pigments, carbon black, glass spheres, calcium sulfate and such chemically inert organic particulate materials as can withstand processing temperatures above 320° C. Up to 5% of the total composition can be an inorganic, fibrous reinforcement, such as, e.g., wollastonite and chopped glass strands less than about 0.46 cm long.

Such polyaryletherketone compositions and substantially amorphous thermoformable sheets are described in my copending application entitled Thermoformable Polyaryletherketone Sheet, Ser. No. 07/283,695, filed Dec. 13, 1988. Because of their substantial lack of crystallinity, these sheets can be thermoformed at temperatures below 200° C., sometimes as low as 160° C. As a result, the laminates of the present invention can be thermoformed below the temperature at which thermal degradation of polyvinyl fluoride occurs.

The polyaryletherketone sheets are formed by standard processing methods, preferably by melt extrusion. Conventional single screw or twin screw extruders, sheeting dies, and take-up devices designed for extrusion of thermoplastics into sheets are satisfactory. The extrusion temperature will depend on the polymer melt temperature (which is influenced by the T:I ratio of the polyaryletherketone) as well as on the molecular weight (or melt viscosity). For example, when the T:I ratio is 70:30 or 50:50, the preferred extrusion temperature is between about 360° C. and 370° C.; and when the T:I ratio is 60:40, the preferred extrusion temperature is between about 325° C. and 340° C. The melt viscosity of the polyaryletherketones suitable for making sheets useful in this invention preferably will range from about 3000 Pa-s to about 300 Pa-s at a shear rate of 180 s$^{-1}$ as measured at 360° C. for the T:I isomer ratio of 70:30 and 50:50 and at 340° C. for the T:I isomer ratio of 60:40 in a capillary rheometer equipped with a die with an orifice 1.19 mm in diameter and a length to diameter ratio of 3.91. In general, extrusion temperatures from about 10° C. to about 50° C. above the melting point of the polyaryletherketone are satisfactory. Extrusion temperatures toward the lower end of the above range are preferred in order to minimize degradation, and preferably should be below 400° C. Also, as sheet thickness is increased, it is usually preferable to operate at the lower end of the available temperature range. Higher extrusion temperatures are possible, but polymer degradation is more likely.

The extruded polyaryletherketone sheet is conveyed from the die directly over polished metal or textured roll(s), commonly termed "chill rolls" because the surface temperature of these rolls is maintained at a level below the melt temperature of the polymer. The rate at which the sheet is cooled, termed the quench rate, and solidified is a critical aspect in achieving the amorphous sheet structure of this invention. The quench rate is largely determined by the temperature of the chill rolls, sheet thickness and line speed and must be sufficiently rapid for the forming characteristics and physical properties inherent in such a sheet to be realized, without being so rapid that a warped or curled sheet results. It is believed that the dependence of physical properties and formability on quench rate is related to inherent polymer properties, such as crystallization rate and the rate of solidification of the polymer as it cools through the glass transition temperature.

Figure 2:
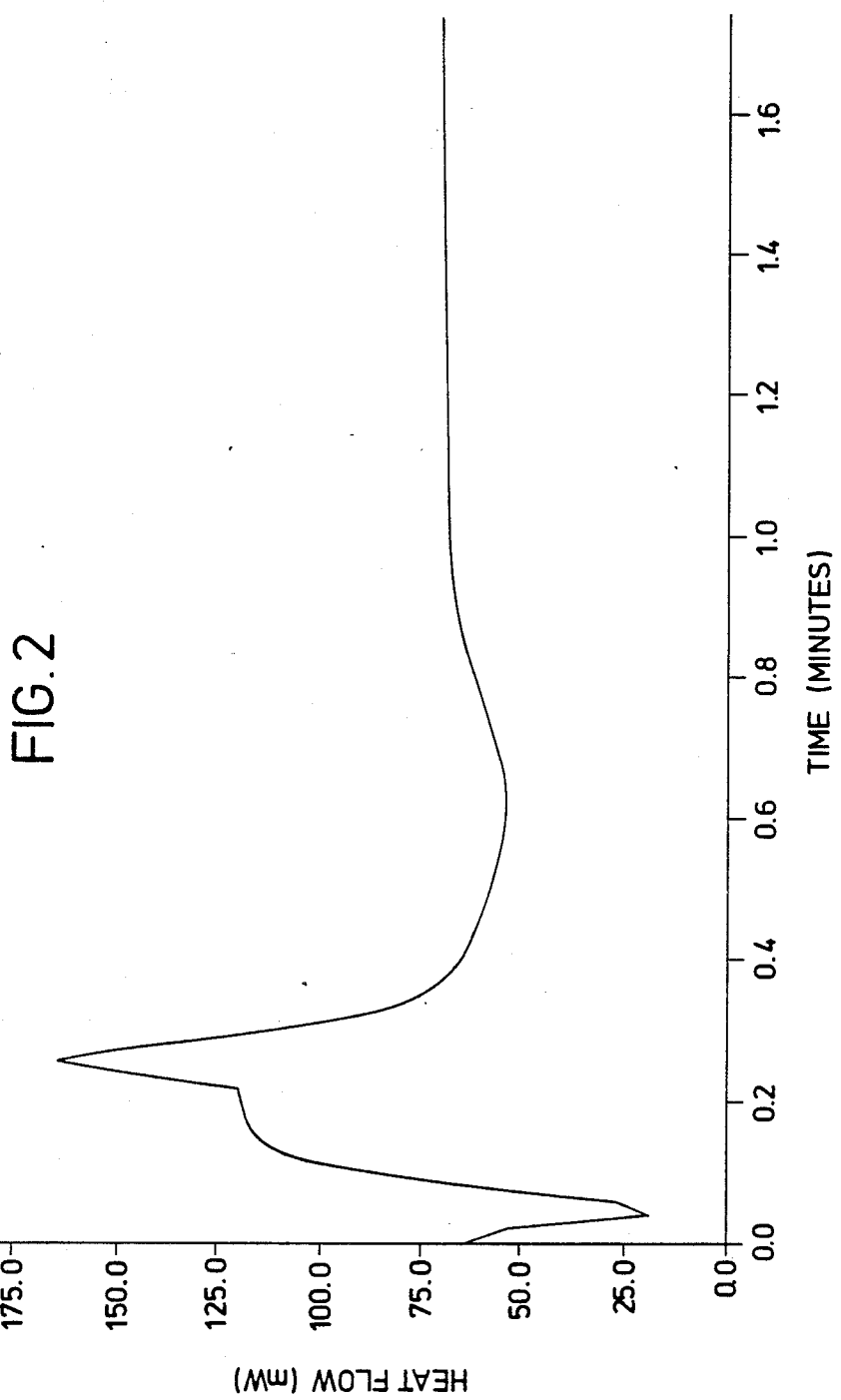
FIG. 2 is a differential scanning calorimetry (DSC) plot of a typical polyaryletherketone.

Referring now to FIG. 1, it represents a plot of a polyaryletherketone property arbitrarily called "crystallization half-time" versus temperature. According to the definition adopted by the inventor, crystallization half-time is the amount of time it takes an amorphous sample to reach the crystallization exotherm maximum of the polymer, as determined by differential scanning calorimetry (DSC), when held at a given temperature. Thus, while crystallization half-time does not necessarily represent half of the time required for the completion of the polyaryletherketone crystallization process, it has been demonstrated to be predictive of observed behavior for the systems under consideration. FIG. 2 is a typical DSC scan of this type for a polyaryletherketone consisting essentially of the defined repeating units having a T:I isomer ratio of 70:30.

The minimum quenching rates for various polyaryetherketones of the defined structure can be estimated as follows:

(a) It has been experimentally demonstrated by X-ray crystallography that maximum polyarylketherketone crystallinity, $Cr_{max}$, is 30%±3%.

(b) It is assumed that approximately one-half of $Cr_{max}$ (or 15%) will be reached at the end of crystallization half-time, as defined above.

(c) At normal quenching rates, significant crystallization occurs only along the lowest portion of the curves shown in FIG. 1. See Table 1, below.

(d) A satisfactory quenching rate will be such that the temperature span from the melt processing temperature to the lowest temperature in the significant crystallization range will be traversed within at most one-third of the shortest crystallization half-time, so that crystallinity will be at most about 5%.

TABLE 1

| Composition T:I isomer ratio | Shortest crystall. half-time, min. | Significant cryst. temp. range, °C. | Typical melt processing temp., °C. | Min. quench rate, °C./min | Max. line speed, m/min | Max. sheet thickn. microm. |
|---|---|---|---|---|---|---|
| 50:50 | 2 | 275–210 | 360 | 225 | 0.9–2.3 | 625–2000 |
| 60:40 | 2.75 | 270–215 | 340 | 136 | 0.9–3.6+ | 625–5000 |
| 70:30 | 1 | 285–205 | 360 | 465 | 0.9 | 625 |
| 80:20 | 0.25 | 320–190 | 380 | 2280 | impract. | 625 |

As an example, for a 70:30 terephthalyl to isophthalyl isomer ratio, an extruded 74 cm wide, 1000 micrometer (0.1 cm) thick polyaryletherketone sheet having a specific gravity of approximately 1.45 g/cm³, moving at a line speed of 0.9 m/min (1.9 kg of material per min) is quenched from the melt processing temperature of 360° C. to 205° C. (a temperature drop of 155° C.). This temperature range should be traversed in one-third of the shortest crystallization half-time (which is 1 minute), or in approximately 20 seconds or less, so that the quench rate is approximately 465° C./min.

Quench rate determines whether crystallinity develops in the extruded sheet. Table 1 includes three important variables: T:I isomer ratio, sheet thickness, and line speed. As line speed increases and/or thickness increases, the longer the sheet is at a higher temperature (heat dissipation being less efficient), and hence the greater is the risk of developing crystallinity, unless the quench rate for the particular polymer is sufficiently low.

Quench roll temperature does not play a significant role in this process since the temperature must be chosen so that flat sheet is obtained, and this does not permit much variation. If the temperature is too high, the sheet will stick to the roll, and if it is too low, a flat uniform sheet will not be obtained. For most practical purposes, the quench temperature range will be from about 110° C. to just above the glass transition temperature of the polymer.

The choice of the quench rate also will depend upon the melt viscosity of the polymer (related to its molecular weight) and to the thickness of the sheet. To achieve the proper rate of cooling, the chill rolls must be capable of being heated, either electrically or by a heat transfer fluid, up to a temperature of about 160° C. One skilled in the art would be able to experimentally determine the optimum quench rate by running two or at most three simple experiments, especially in the light of the examples given herein, which illustrate the effect of the quench rate on the physical properties of the sheet and its thermoformability.

Polyvinyl fluoride can be produced according to U.S. Pat. No. 3,265,678 (J. L. Hecht) and British Patent 1,077,728 (The Du Pont Company). Polyvinyl fluoride film is produced by extrusion of a polyvinyl fluoride dispersion in a latent solvent (e.g., N,N-dimethylformamide, dimethyl sulfoxide) followed by solvent evaporation. A latent solvent solvates the resin at an elevated temperature but does not react with the resin particles. Pigments, stabilizers, flame modifiers, plasticizers, deglossing agents and other additives may be incorporated in the dispersion prior to extrusion. The extruded film can be biaxially oriented to varying degrees, if desired. To enhance film adherability, several treatment methods may be used: flame treatment, exposure to electric discharge, boron trifluoride gas, activated gas plasma, potassium dichromate-containing sulfuric acid, and solution of alkali metal in liquid ammonia (see: Kirk-Othmer: Encyclopedia of Chemical Technology, Vol. 11, 3rd Ed., pgs. 57-64, John Wiley & Son, 1980).

The amorphous polyaryletherketone sheet may be readily laminated to polyvinyl fluoride film by the methods and using processing equipment normally employed in the industry to laminate polyvinyl fluoride film to other types of thermoplastics, that is, by hot melt, roll to roll, heated nip roll, extrusion lamination, pultrusion, multiopening hydraulic press, or platen press. The choice of method and equipment is dictated by the desired end use, physical properties and optimum use of material. All lamination methods utilize either thermoplastic or thermoset adhesives with or without curing agents, the choice of adhesive being dictated by equipment or cost. Useful adhesives include acrylics, polyesters, polyamides, epoxies, urethanes, silicones and rubbers.

The polyaryletherketone/polyvinyl fluoride laminate of this invention may be readily thermoformed by the methods and using processing equipment normally employed in the industry to form other types of thermoplastic laminates, that is, by vacuum, pressure, mechanical or twin sheet forming. The forming conditions required to produce satisfactory articles will depend on several process variables, such as mold complexity and dimensions, sheet thickness and polymer variables, such as melt viscosity and T:I ratio. These conditions can be determined by techniques typically used by those skilled in the art of thermoforming.

The forming temperature range of the laminated polyaryletherketone/polyvinyl fluoride sheet is from 160° C. to 200° C., preferably from 170° C. to 195° C. The time required to heat the laminated sheet to the forming temperature range prior to the forming event is an important variable in the process of thermoforming the laminated sheet of this invention. In general, the preheat time in the forming temperature range should be minimized while still maintaining a uniform heat distribution in the sheet, in order to achieve uniform draw in the forming step and to avoid significant polyvinyl fluoride degradation. Since residence time will depend on process variables, such as laminated sheet dimensions, particularly thickness, thermal characteristics of the particular oven and the forming temperature range desired, the exact forming conditions must be determined by experimentation and can be readily established by a plastics engineer. Although either radiant or convection ovens are suitable for preheating, radiant heaters are preferred because of their efficiency. Radiant heater surface temperatures normally are maintained between 500° C. and 1100° C., preferably between 600° C. and 900° C. Excessively high sheet temperatures or oven residence time can result in polyvinyl fluoride degradation or in poor forming characteristics of the laminated sheet, such as inadequate draw or lack of mold definition and brittleness in the formed articles. Poor forming is believed to be the result of crystallinity developed in the polyaryletherketone polymer.

Polyaryletherketone/polyvinyl fluoride laminates can be vacuum thermoformed, with or without pressure or plug assist. Vacuum levels should be at least 68 kPa. Forming pressures will range from atmospheric to about 690 kPa. Mold temperatures will range from ambient to about 150° C. Elevated mold temperatures and/or additional pressure generally minimize internal stresses and provide better detail and material distribution, resulting in a more uniform article.

Thermoformed articles from the polyaryletherketone/polyvinyl fluoride laminates of the present invention demonstrate excellent mold shape and surface replication and retention of the original polyvinyl fluoride film gloss level. The formed articles substantially retain the physical properties of the polyaryletherketone sheet component of the laminate and have excellent appearance of the polyvinyl fluoride film component of the laminate. Such articles are useful in a variety of applications, such as interior panels and other components for aircraft interiors.

This invention is now illustrated by the following examples of certain representative embodiments thereof, where all parts, proportions, and percentages are by weight unless otherwise indicated.

Example 1

Polyaryletherketone made from diphenyl ether (DPE), terephthalyl chloride, and isophthalyl chloride, with a T:I isomer ratio of 70:30, having a melt viscosity of 331 Pa-s at 542 $s^{-1}$ at 360° C., was injection molded into 15.4 cm×15.4 cm×0.22 cm plaques using an an unvented, single screw, 62 HPM injection molding machine schematically represented in FIG. 3. In FIG. 3, F is the feed port; B1, B2, and B3 are different barrel zones; N is the nozzle; and M is the mold. Temperature profiles were as follows: B1=307° C., B2=359° C., and B3=351° C.; N=363° C.; M=130° C.

These polyaryletherketone plaques were laminated to 51 micrometer thick Tedlar ® (Du Pont Co.) polyvinyl fluoride film type TES20BE5 which was gravure coated, using a 110 line engraved cylinder, with a methyl ethyl ketone solution of Bostik ® 7132 polyester adhesive containing Bostik ® B4 curing agent in a 2 to 1 volume mix ratio. Dry coating thickness was 5.1 micrometers. Prior to lamination, the samples were wiped clean with isopropyl alcohol; the surface was then either untreated, lightly abraded with 100 grit emery paper, or treated with a BD-10 vibrating spark gap capacitor (Tesla coil) from Electro Technique Products to simulate corona treatment. Lamination was achieved by placing the polyaryletherketone plaques and the precoated Tedlar ®film in a platen press set to 127° C. for 8 minutes at 690 kPa. Adhesion level is determined using an adhesion peel test which consists of making two cuts in the laminate 0.64 cm apart and a third cut at a 60°angle across the two cuts. Using a sharp blade, the Tedlar ® film is peeled back. Tearing of the Tedlar ® film, i.e., failure to peel, is considered good adhesion and is marked pass in the test result. All of the above samples passed the peel test.

Example 2

Polyaryletherketone made from DPE and terephthalyl chloride and isophthalyl chloride with a T:I isomer ratio of 70:30, containing 7% of Du Pont R101 ® TiO2 ($TiO_2$) 0.003% of Pfizer RO-3097 Kroma Red ® (Red), and 0.05% of Ferro V-3285 ® dark blue (Blue), having a melt viscosity of 532 Pa-s at a shear rate of 180 $s^{-1}$ at 360° C. was extruded into 74 cm wide, 0.10 cm thick sheeting. The equipment used was a 11.5 cm single screw, unvented extruder where L/D was 30:1 and the compression ratio was 3.5:1, equipped with a 340/250/177 micrometer screen pack and a 138 cm die reduced in width by means of a metal insert to 74 cm, set to a 0.25 cm wide gap and a three roll, 20.5 cm diameter, polished chrome chill roll stack. FIGS. 4 and 4a schematically represents the extruder and the chill roll stack. The temperature profile was as follows: E1=383° C., E2=377° C., E3=371° C., E4=363° C., E5=349° C., for the barrel; A=317° C. for the adapter; and D1=364° C., D2=352° C., D3=354° C., D4=352° C., and D5=364° C. for the die. Tedlar ® type TES2-0BE5 film having a thickness of 51 micrometers, gravure coated as in Example 1 with Du Pont 68080 ® acrylic adhesive to a dry coating thickness of 5.1 micrometers, was laminated to the sheeting by applying the Tedlar ® film directly to the hot sheet after the sheeting emerged from the first two chill rolls and prior to being wrapped around the third chill roll.

The resulting laminated sheeting was cut into 15.4 cm×23.0 cm pieces and vacuum thermoformed using a Brown Machine Company vacuum thermoformer equipped with a "Calrod" heater oven and a 9.63 cm diameter, 3.84 cm deep "top hat" mold at room temperature. Using a vacuum of 94.5 kPa and forming temperatures of 182° C. to 193° C., the resulting articles were moderately well formed as indicated by a thermoforming diameter ratio of 0.87-0.93. These articles showed no Tedlar ® decomposition, which would have caused a film color change. Adhesion was generally good, although there were some areas that were only moderately adhered, due in part to a rough sheet surface.

Thermoforming diameter ratio, for articles from a "top hat" mold, is defined as the ratio of the diameter of the thermoformed article at a point equal to ½ the depth of the mold divided by the diameter of the mold. This ratio reflects the extent to which the molded article matches the shape of the mold and, hence, how well a part is formed. A value of 1 indicates perfect formability, whereas for the purposes of this invention a thermoforming diameter ratio equal to or greater than 0.85 indicates acceptable formability.

Example 3

Polyaryletherketone made from DPE and terephthalyl chloride and isophthalyl chloride with a T:I isomer ratio of 60:40, containing 12.3% by weight $TiO_2$, 0.017% Red and 0.13% Blue, having a melt viscosity of 912 Pa-s at a shear rate of 156 $s^{-1}$ at 360° C., was extruded into 74 cm-wide, 0.20 cm-thick sheeting using the equipment described in Example 2, except for the chill roll stack. The upper chill roll was a textured, 25.4 cm diameter, cast silicone roll and the bottom polished chrome chill roll was removed and placed behind the upper two rolls at an approximately 60° angle to the middle chill roll. FIGS. 4 and 4b schematically represents the extruder and the chill roll stack, where E1=338° C., E2=377° C., E3=377° C., E4=349° C., and E5=332° C. for the barrel; A=338° C. for the adapter; and D1=340° C., D2=332° C., D3=332° C., D4=332° C. and D5=340° C. for the die. The upper chill roll was 140° C.; the middle chill roll was 130° C.; and the third chill roll was unheated.

The resulting sheeting was laminated using the same equipment as in Example 1 and 51 micrometer thick Tedlar ® type TMB20BE5 film, gravure coated with Du Pont 68080 ® acrylic adhesive as in Example 2. Lamination conditions were 184° C. for 8 minutes and 690 kPa. Laminated sheets, 15.4 cm×23.0 cm, were vacuum thermoformed using the same equipment as in Example 2. Forming temperatures of 165° C. to 195° C. were utilized. Table 1 provides thermoforming diameter and adhesion peel test results, all of which indicate well-formed parts.

TABLE 2

| Forming Temperature (°C.) | Thermoforming Diameter Ratio | Adhesion Peel |
|---|---|---|
| 165 | 0.90 | Pass |
| 180 | 0.95 | Pass |
| 195 | 0.98 | Pass |

Example 4

Tedlar ® type TBK15B9 film having a thickness of 51 micrometers, gravure coated with Du Pont 68080 ® acrylic adhesive as in Example 2, was laminated to the same polyaryletherketone sheeting as in Example 3. Lamination was accomplished using the heated nip roll station on an Interoto ® roll laminator. This nip roll station contains a moveable rubber roll perpendicular to a heated chrome roll and the contact of the two rolls is 96 mm. The equipment was threaded with the Tedlar ® film; the polyaryletherketone sheet, preabraded using 120 grit emery paper and a 10 cm×10 cm orbital sander, was hand fed into the heated nip roll (184° C.) with the nip open. The nip was closed, and a force of 10534 g/cm applied. After three passes, good adhesion was achieved.

The laminated sheets, 15.4 cm×23.0 cm, were vacuum thermoformed using the same equipment as in Example 2. Forming temperatures were 165° C. to 195° C. Table 2 contains thermoforming diameter and adhesion peel test results, all of which indicate well-formed laminated parts.

TABLE 3

| Forming Temperature (°C.) | Thermoforming Diameter Ratio | Adhesion Peel |
|---|---|---|
| 165 | 0.90 | Pass |
| 180 | 0.95 | Pass |
| 195 | 0.98 | Pass |

Example 5

Polyaryletherketone sheeting, 0.10 and 0.15 cm thick, was prepared using the same pigmented polymer and processing conditions described in Example 3. One-half of the sheeting was laminated with 51 micrometer thick Tedlar ® type TMB20BE5 film, as described in Example 3. The laminated and unlaminated sheets were cut into 30.5 cm×30.5 cm blanks and thermoformed on a Plastic Equipment Co. vacuum thermoformer using a 93° C. mold consisting of a 6 cm deep×14 cm outer diameter cylinder with a 3.4 cm deep×9.2 cm outer diameter concave center insert set 2 cm from the outer rim of the larger cylinder. In all cases where the Tedlar ® film laminated sheet was used, the Tedlar ® film laminated side was on the underside. Sheet preheat temperature was 193° C.

The formed articles were cut into four different sections (A, B, C and D), the thicknesses of which were measured and the variances calculated, pooled and compared. The results are given in Table 5. Statistical analysis, f test, indicates with a 95% confidence level that all the 0.1 cm thick, Tedlar ® film-laminated samples have a more uniform thickness than the unlaminated samples. With the exception of sample D, the same was true at the 90% confidence level. For the 0.15 cm thick samples, the same result was obtained both at the 95% and the 90% confidence level for samples B, C, and D, but not for samples A. The various sections were cut from the samples as follows:

| Section | Area from which section cut |
|---|---|
| A | 5 × 5 cm flat section at the edge of mold from cylinders |
| B | 2 cm wide × 6 cm long top of rim separating the cylinders |
| C | bottom of inner cylinder |
| D | 6 cm wide × 6 cm high side of outer cylinder. |

TABLE 5

| Sheet Thickness (cm) | Tedlar ™ | Pooled Variance | | | |
|---|---|---|---|---|---|
| | | Section A | Section B | Section C | Section D |
| 0.10 | Yes | 0.760653 | 0.0397659 | 0.475156 | 0.140006 |
| 0.10 | No | 4.25501 | 5.8417 | 1.00523 | 0.0628958 |
| 0.15 | Yes | 16.218 | 0.0648329 | 0.004075 | 0.0249482 |
| 0.15 | No | 23.38 | 0.11485 | 0.18518 | 0.114394 |

I claim:
1. A thermoformable laminate of a polyaryletherketone sheet having a thickness of about 625 to 5000 micrometers and a polyvinyl fluoride film having a thickness of about 12.8 to 204 micrometers, wherein the polyaryletherketone sheet has a crystallinity of less than about 5% and consists essentially of repeating units corresponding to the following formula:

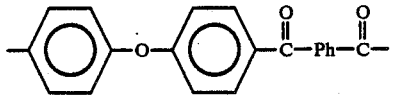

wherein Ph is either the 1,4-phenylene or the 1,3-phenylene group, the ratio of 1,4-phenylene groups to 1,3-phenylene groups being about 70:30 to 0:100.

2. A laminate of claim 1 wherein the ratio of 1,4-phenylene groups to 1,3-phenylene groups in the polyaryletherketone sheet is about 70:30 and the sheet has a thickness of about 625 micrometers.

3. A laminate of claim 1 wherein the ratio of 1,4-phenylene groups to 1,3-phenylene groups of the polyaryletherketone sheet is about 60:40 to 0:100.

4. A laminate of claim 3 wherein the ratio of 1,4-phenylene groups to 1,3-phenylene groups in the polyaryletherket-one sheet is about 60:40 to 50:50.

5. A laminate of claim 4 wherein the thickness of the polyaryletherketone sheet is 625–2000 micrometers.

6. A three-dimensional panel thermoformed from a laminate of a polyaryletherketone sheet having a thickness of about 625 to 5000 micrometers and a polyvinyl fluoride film having a thickness of about 12.8 to 204 micrometers, wherein the polyaryletherketone sheet has a crystallinity of less than about 5% and consists essentially of repeating units corresponding to the following formula:

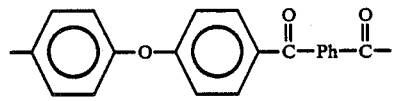

wherein Ph is either the 1,4-phenylene or the 1,3-phenylene group, the ratio of 1,4-phenylene groups to 1,3-phenylene groups being about 70:30 to 0:100.

7. panel of claim 6 wherein the ratio of 1,4-phenylene groups to 1,3-phenylene groups in the polyaryletherketone sheet is about 70:30 and the sheet has a thickness of about 625 micrometers.

8. A panel of claim 6 wherein the ratio of 1,4-phenylene groups to 1,3-phenylene groups of the polyaryletherketone sheet is about 60:40 to 0:100.

9. A panel of claim 6 wherein the ratio of 1,4-phenylene groups to 1,3-phenylene groups in the polyaryletherketone sheet is about 60:40 to 50:50.

10. A panel of claim 9 wherein the thickness of the polyaryletherketone sheet is 625–2000

11. A panel of claim 9 wherein the ratio of 1,4-phenylene groups to 1,3-phenylene groups of the polyaryletherketone sheet is about 60:40.

* * * * *